(12) United States Patent
Forster (10) Patent No.: US 10,679,478 B2
(45) Date of Patent: Jun. 9, 2020

(54) DUAL FUNCTION STRAP FOR RESONATING ELEMENTS AND ULTRA HIGH FREQUENCY ANTENNAS

(71) Applicant: AVERY DENNISON RETAIL INFORMATION SERVICES, LLC, Mentor, OH (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 62 days.

(21) Appl. No.: 15/858,363

(22) Filed: Dec. 29, 2017

(65) Prior Publication Data

US 2018/0211499 A1  Jul. 26, 2018

Related U.S. Application Data

(60) Provisional application No. 62/440,131, filed on Dec. 29, 2016.

(51) Int. Cl.
*G08B 13/24* (2006.01)
*G06K 19/077* (2006.01)
(Continued)

(52) U.S. Cl.
CPC ...... *G08B 13/2417* (2013.01); *E05B 73/0017* (2013.01); *G06K 19/0724* (2013.01);
(Continued)

(58) Field of Classification Search
CPC ............ G08B 13/2417; G08B 13/2448; G08B 13/2434; G06K 19/0779; G06K 19/07786;
(Continued)

(56) References Cited

U.S. PATENT DOCUMENTS 7,158,037 B2  1/2007  Forster et al.
7,292,148 B2  11/2007  Forster
(Continued)

OTHER PUBLICATIONS

International Search Report and Written Opinion of the ISA/EPO prepared for PCT/US2017/068961 dated Jul. 17, 2018.
(Continued)

*Primary Examiner* — Adnan Aziz
(74) *Attorney, Agent, or Firm* — Avery Dennison Retail Information Services, LLC (57) ABSTRACT

A combined EAS and RFID circuit includes an HF coil antenna, a UHF tuning loop, and an RFID chip coupled to a strap that includes a first coupling area and a second coupling area. The coil ends of the HF coil antenna are configured to capacitively and/or conductively couple to one or both of the first coupling area or second coupling area of the strap. The HF coil antenna can include a gap between turns for non-interfering placement of the UHF tuning loop. The EAS circuit can be deactivating upon application of a field at the resonant frequency of sufficient intensity to cause the breakdown voltage to be exceeded between a coil end and coupling area. The threshold breakdown voltage between a coil end and a coupling area can be reduced by laser ablation treatment of a conductive surface of one or both of the coil end or coupling area.

14 Claims, 10 Drawing Sheets

(51) Int. Cl.
*E05B 73/00* (2006.01)
*H01Q 7/00* (2006.01)
*H01Q 1/22* (2006.01)
*G06K 19/07* (2006.01)

(52) U.S. Cl.
CPC ... *G06K 19/0779* (2013.01); *G06K 19/07756* (2013.01); *G06K 19/07767* (2013.01); *G06K 19/07779* (2013.01); *G06K 19/07786* (2013.01); *G08B 13/2434* (2013.01); *G08B 13/2448* (2013.01); *H01Q 1/2225* (2013.01); *H01Q 7/00* (2013.01)

(58) Field of Classification Search
CPC ....... G06K 19/07779; G06K 19/07767; G06K 19/07756; G06K 19/0724; E05B 73/0017; H01Q 7/00; H01Q 1/2225
See application file for complete search history.

(56) References Cited

U.S. PATENT DOCUMENTS

| | | | | |
|---|---|---|---|---|
| 7,500,610 | B1* | 3/2009 | Hadley | G06K 19/07718 235/451 |
| 8,026,818 | B2* | 9/2011 | Cote | G06K 19/0723 336/200 |
| 9,489,611 | B1 | 11/2016 | Diorio et al. | |
| 2005/0001785 | A1* | 1/2005 | Ferguson | G06K 19/07745 343/895 |
| 2008/0088460 | A1* | 4/2008 | Copeland | G06K 19/0726 340/572.7 |
| 2008/0315992 | A1* | 12/2008 | Forster | G06K 19/07749 340/10.1 |
| 2009/0140860 | A1* | 6/2009 | Forster | G06K 19/0723 340/572.1 |
| 2009/0231139 | A1* | 9/2009 | Heurtier | G06K 19/0724 340/572.7 |
| 2010/0001079 | A1* | 1/2010 | Martin | G06K 19/07749 235/492 |
| 2010/0123553 | A1* | 5/2010 | Banerjee | H01Q 1/2208 340/10.1 |
| 2010/0230498 | A1 | 9/2010 | Atherton | |
| 2011/0001620 | A1* | 1/2011 | Copeland | E05B 73/0017 340/572.7 |
| 2012/0242318 | A1* | 9/2012 | Forster | G06K 19/07749 324/71.1 |
| 2014/0263659 | A1* | 9/2014 | Kervinen | G06K 19/027 235/488 |
| 2016/0086465 | A1* | 3/2016 | Li | G08B 13/2448 340/572.7 |
| 2016/0180213 | A1* | 6/2016 | Forster | G06K 19/07786 235/492 |
| 2016/0342883 | A1* | 11/2016 | Huhtasalo | G06K 19/07767 |
| 2017/0076573 | A1* | 3/2017 | Forster | G08B 13/2417 |
| 2017/0270323 | A1* | 9/2017 | Butler | G06K 7/0008 |

OTHER PUBLICATIONS

International Preliminary Report on Patentability of the ISA/EPO prepared for PCT/US2017/068961 dated Jul. 2, 2019.

* cited by examiner

FIG. 7

DUAL FUNCTION STRAP FOR RESONATING ELEMENTS AND ULTRA HIGH FREQUENCY ANTENNAS

CROSS-REFERENCE TO RELATED APPLICATION(S)

The present application claims priority to and the benefit of U.S. Provisional Patent Application No. 62/440,131 filed Dec. 29, 2016, which is incorporated herein by reference in its entirety.

TECHNICAL FIELD

The subject application teaches embodiments that relate generally to combined HF and UHF circuits, and specifically to coupling regions configured to support both EAS antenna elements and RFID chips.

BACKGROUND

Electronic Article Surveillance (EAS) systems typically operate in the high frequency (HF) range, nominally at 8.2 MHz, while certain Radio Frequency Identification (RFID) systems operate in the ultra high frequency (UHF) range, nominally at 865 MHz. EAS systems typically include a HF coil antenna coupled to a capacitive element that forms a resonant circuit configured to return a signal when excited by a nearby field at the resonant frequency of the EAS circuit elements. UHF RFID systems typically include a UHF antenna and/or tuning loop coupled to an RFID chip that powers the RFID chip when excited by a nearby field at the resonant frequency of the UHF antenna and internal capacitance of the RFID chip. The RFID chip sends a coded return signal when powered. Typically, EAS devices and RFID devices are used for different purposes and are manufactured and sold as separate items.

DETAILED DESCRIPTION

The systems and methods disclosed herein are described in detail by way of examples and with reference to the FIGS. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The present disclosure illustrates new modalities for straps for combined EAS and RFID circuits. The systems and methods disclosed herein describe various aspects of straps and antenna structures for combined EAS and RFID circuits.

EAS devices and RFID devices are generally designed for different functions and, therefore, are manufactured separately. For example, EAS devices are generally attached to items and are used to prevent theft of those items from stores by requiring deactivation of the EAS device at a point-of-sale terminal when purchased. RFID devices can be used for many different purposes including, for example, item identification, item tracking, and inventory. As can be appreciated, items can include both an EAS device and an RFID device to provide the respective benefits of both devices. For example, consumer goods can include both an EAS device and an RFID device to allow for theft protection and for inventory management.

Combining the functionality of an EAS device and an RFID device into a single device can provide several advantages. One advantage is that combining an EAS device and an RFID device into a single device reduces manufacturing and inventory costs required for multiple tags. Another advantage is that combining an EAS device and an RFID device into a single device reduces the number of devices that must be separately attached to each item or the number of customized supply chains applying different tags to items. This reduces the potential for damage to items that might be caused by numerous attachment points to an item. This also reduces the number of attached devices that might need to be removed by the consumer or merchant, potentially saving time and reducing labor costs. Yet another advantage of combining an EAS device and an RFID device into a single device is that the radio frequency elements can be purposefully isolated from one another to avoid interference. When separate EAS devices and RFID devices are in close proximity, it is possible for the radio frequency elements in one device to interfere with the function of the other device. A single combined device can be designed to reduce the likelihood of interference.

Figure 1A:
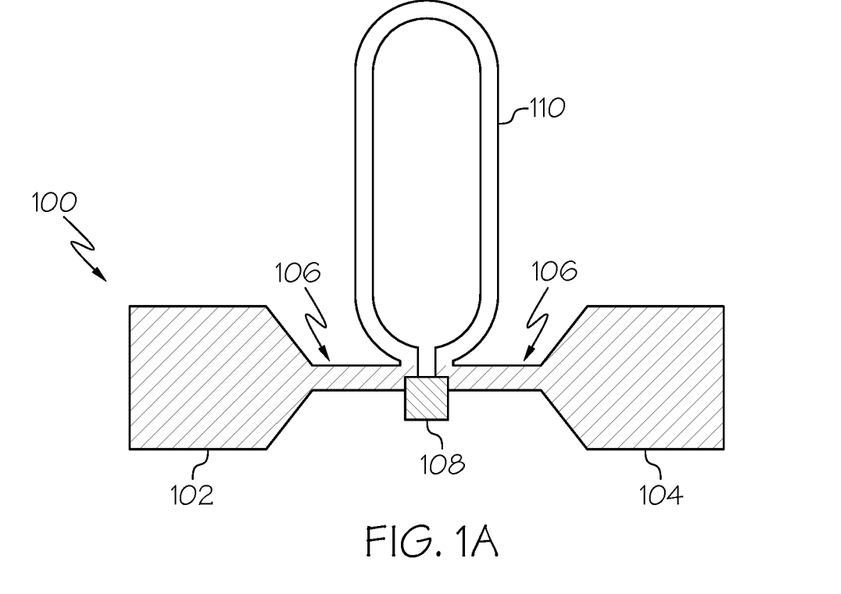
FIG. 1A is a diagram of a first configuration of an RFID strap according to an embodiment of the disclosure.

Turning to FIG. 1A, a strap structure 100 is illustrated. The strap structure 100 comprises a first coupling pad 102 and a second coupling pad 104. An RFID chip 108 operating in the ultra high frequency (UHF) spectrum, for example at or near 865 MHz, is connected to the strap structure 100. The frequency of the RFID chip 108 presently set forth is not limited to any particular frequency. For instance, an RFID chip 108 may operate at 13.56 MHz. In certain configurations, the RFID chip 102 can be connected via narrow sections 106 of the strap structure 100. An inductive element, UHF tuning loop 110, can be configured to provide a resonance with the capacitance of the RFID chip 108 in the UHF frequency range. The strap structure 100 can be directly coupled, or conductively coupled, to the UHF tuning loop 110.

Figure 1B:
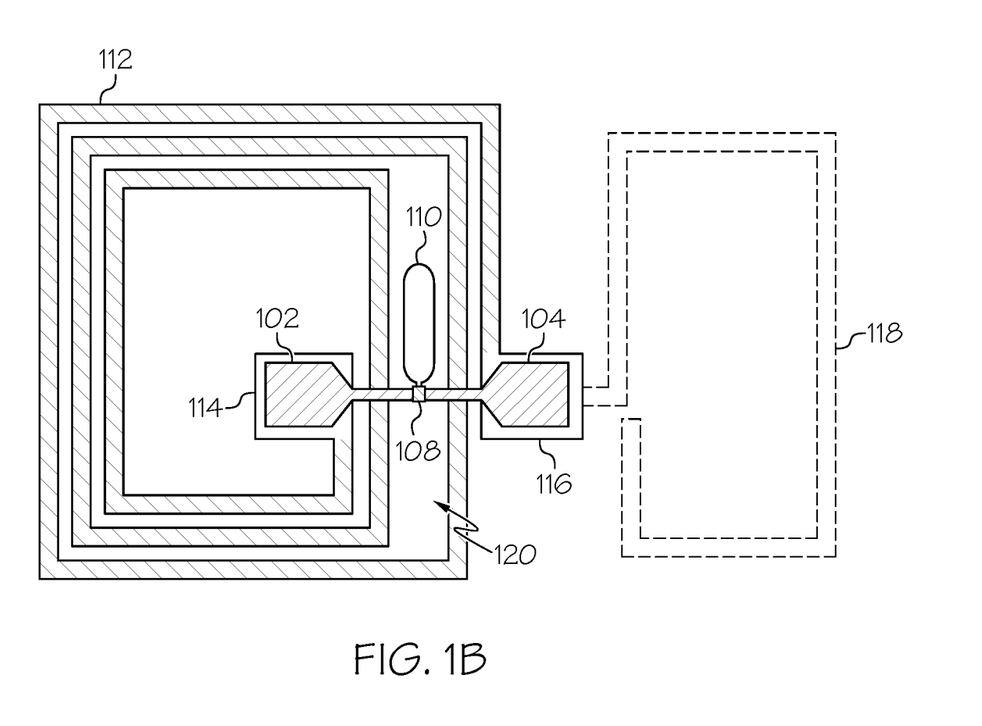
FIG. 1B is a diagram of a first configuration of a combined EAS and RFID circuit according to an embodiment of the disclosure.

Referring also to FIG. 1B, a coil antenna 112 is coupled to the strap structure 100. The coil antenna 112 comprises an inner coil end 114 and an outer coil end 116 that interface with the first coupling pad 102 and second coupling pad 104 respectively of the strap structure 100. In a first configuration, as shown in FIG. 1, the coil antenna 112 can be capacitively coupled to the strap structure 100. In a second configuration, the coil antenna 112 can be conductively coupled to the strap structure 100. The coil antenna 112, due to its structure, can operate as a slot or pole type UHF antenna. In certain embodiments, an additional UHF antenna element 118 can be provided.

The coil antenna 112 can be configured such that a gap 120 is created between turns of the coil antenna 112, allowing the UHF tuning loop 110 to be placed between the turns of the coil antenna 112 as illustrated in FIG. 1B. This can advantageously ensure that the metal of the coil antenna 112 does not pass directly under the UHF tuning loop 110 which could change the inductance of the UHF tuning loop 110 and could introduce unwanted losses, or otherwise interfere with the operation of the circuit.

The coil antenna 112 resonates with the total capacitance presented by the strap structure 100 via the UHF tuning loop 110. The UHF tuning loop 110 can present a relatively low inductance on the order of about 20 nH to about 30 nH which is negligible at the desired resonant frequency for the coil antenna 112. The desired resonant absorption frequency for EAS systems is approximately 8.2 MHz. The UHF tuning loop 110 can therefore operate as a structure commonly described as a bridge.

A feature of EAS components is the ability to deactivate the EAS functionality of the circuit at a point of sale terminal when an item is purchased by a consumer. Typically this is achieved by exposing the circuit to a strong field at, or near, the circuit's resonant frequency. This exposure of the circuit at the resonant frequency causes a high current to flow in the conductors and an associated high voltage to be developed across the capacity components.

Figure 2A:
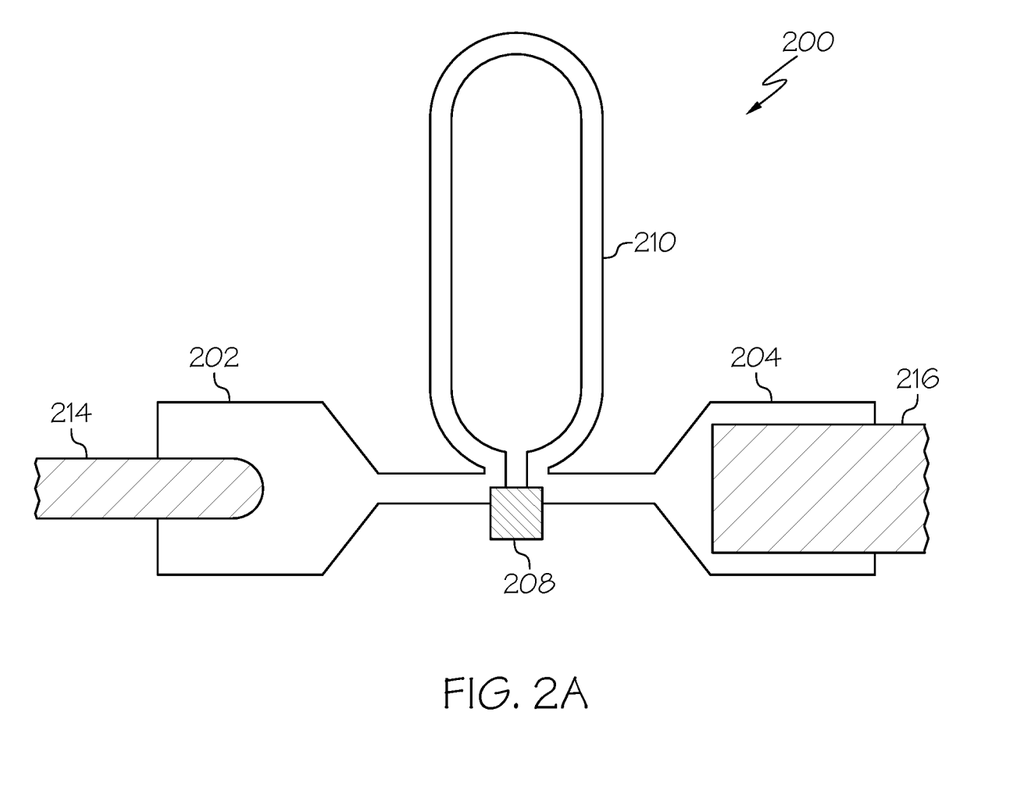
FIG. 2A is a diagram of a second configuration of an RFID strap according to an embodiment of the disclosure.

Referring now to FIG. 2A, an improved strap/bridge circuit 200 is disclosed. In the improved strap/bridge circuit 200, the overlap between each of the coil ends of the antenna coil and the associated coupling pads can be configured to be different. In the embodiment illustrated in FIG. 2A, the inner coil end 214 of the coil antenna can be configured to be smaller than the outer coil end 216 of the coil antenna. The first coupling pad 202 and second coupling pad 204 can be coupled to the inner coil end 214 and outer coil end 216 respectively via an adhesive that acts as a dielectric between the coil ends and coupling pads. The capacitance associated with the coil ends and coupling pads is proportional to the overlap area and is: $1/C_{total}=1/C_1+1/C_2$ where $C_1$ is the capacitance between the inner coil end 214 and the first coupling pad 202, and $C_2$ is the capacitance between the outer coil end 216 and the second coupling pad 204.

Although the illustration of FIG. 2A shows changes in dimensions only for the coil ends, in other embodiments the sizes of one or more of the coil ends and/or one of more of the coupling pads can be configured to be different as would be understood in the art.

The circuit resonates at a resonant frequency that is determined by the inductance of the antenna coil and tuning coil, and the total capacitance determined by the configuration of the coil ends and coupling pads. When an electromagnetic field is presented to the circuit at or around the resonant frequency, a common current flows through the capacitors $C_1$ and $C_2$. The voltage across each of the capacitors $C_1$ and $C_2$ is inversely proportional to the capacitance of each. Therefore, by minimizing $C_1$ and maximizing $C_2$ it is possible to develop a higher voltage across $C_1$ than $C_2$. In this way, the highest possible voltage for a given field strength is developed across $C_1$. The dielectric (adhesive) used to couple the coil end to the coupling pad can be formulated to undergo a dielectric breakdown at a threshold breakdown voltage that is lower than the voltage presented at $C_1$ but higher than the voltage presented at $C_2$. The breakdown voltage can be selected by changing the dielectric constant, the conductivity, thickness, or other suitable property of the dielectric (adhesive) so as to make any resonance of the circuit undetectable by an EAS gate reader system.

Figure 2B:
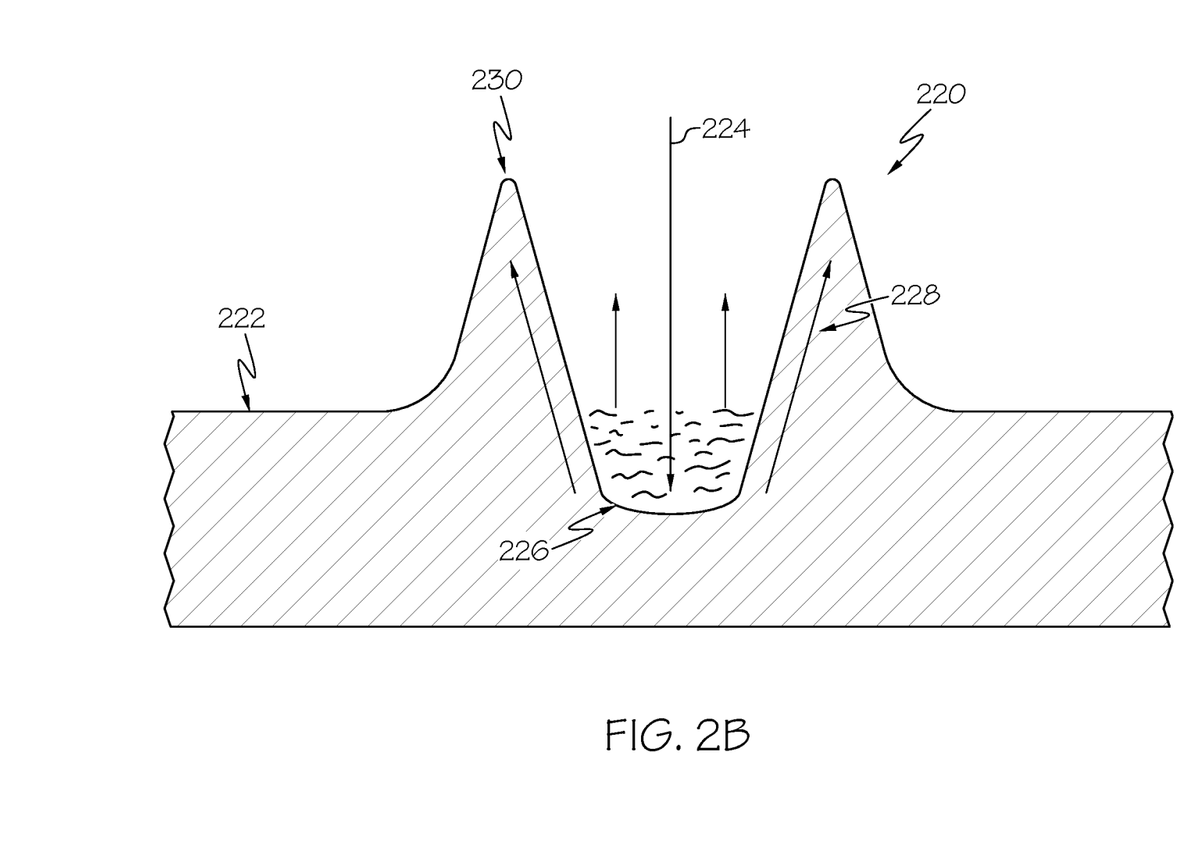
FIG. 2B is a diagram of a laser ablated capacitive plate configured to reduce the threshold dielectric breakdown voltage according to an embodiment of the disclosure.

To reduce the voltage at which a capacitor breaks down, one or more points of separation can be reduced between capacitor places. This can be achieved by embossing or otherwise mechanically modifying the metal layers of capacitor plates. Similarly, to reduce the breakdown voltage for $C_1$ or $C_2$, one or more points of separation can be reduced between a coil end and a coupling pad. Referring now to FIG. 2B, a structure 220 on the metal surface 222 of a coil end (and/or a coupling pad) can be made using a laser system. In such embodiments, a laser beam 224, or another suitable means of causing ablation such as an electron beam, causes metal to evaporate at the impact point 226 of the laser beam 224, that also melts adjacent metal 228 which is forced away and up by the pressure of the evaporating metal at the impact point 226. This creates a sharp edged crater-like structure 230 based on the characteristics of the laser beam 224, such as how the laser beam 224 is pulsed, the power incident at the impact point 226, the wavelength, the metal composition, and other factors. In certain embodiments, multiple points on one or more metal surfaces 222 can be made to decrease the breakdown voltage.

Referring again the circuits of FIGS. 1A, 1B, and 2A, in embodiments the UHF tuning loop 110, 210 can be configured to change properties when a high current flows through the UHF tuning loop 110, 210. In certain embodiments, the UHF tuning loop 110, 210 can include a fuse type structure that causes the UHF tuning loop 110, 210 to become an open circuit above a threshold AC current. For example, the UHF tuning loop 110, 210 can become an open circuit when the EAS function of the circuit is de-activated. By opening the UHF tuning loop 110, 210, the tuning of the entire circuit can be changed, leading to a changed read range. For example, in certain embodiments, the read range can be greatly reduced or substantially eliminated. In other certain embodiments, the read range of the circuit could be increased by opening the UHF tuning loop 110, 210.)

Example fuse type structures can include, but are not limited to, polymers with conductive particles and/or structures that normally have a low resistance but which under localized heating caused by a high AC current are caused to expand non-reversibly and have a high resistance.

Figure 3A:
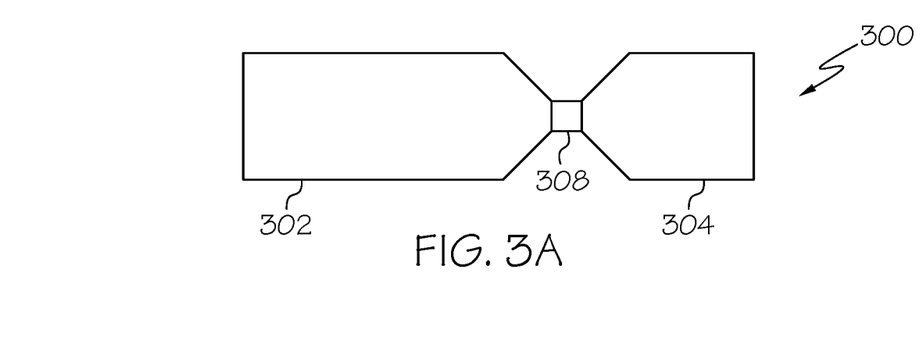
FIG. 3A is a diagram of a third configuration of an RFID strap according to an embodiment of the disclosure.
Figure 3B:
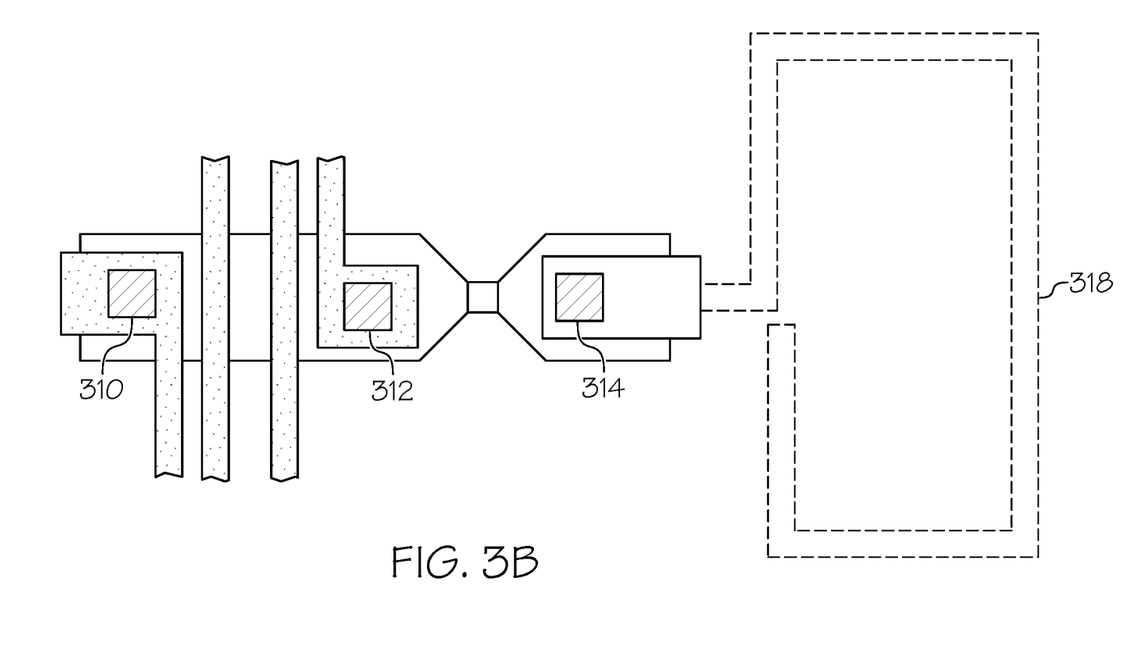
FIG. 3B is a diagram of a second configuration of a combined EAS and RFID circuit according to an embodiment of the disclosure.

Referring now to FIG. 3A, a dual mode strap 300 is illustrated that is configured for both a UHF response and a resonance suitable for triggering an EAS gate. The dual mode strap 300 includes asymmetric coupling pads and includes a relatively large coupling pad 302 and a relatively small coupling pad 304 that are coupled to a UHF RFID chip 308. Referring also to FIG. 3B, the large coupling pad 302 is configured to be large enough to support a first coupling area 310 and a second coupling area 312. The large coupling pad 302 is configured to function as a bridge across the coil ends of an antenna coil with a defined capacitance set by the adhesive properties and the overlaps areas as describe above. The small coupling pad 302 is configured to support a third coupling area 314 for coupling to an additional UHF antenna element 318. The dual mode strap 300 can therefore support both resonant absorption for EAS functionality and UHF RFID functionality as the UHF RFID chip 308 is coupled to the coil antenna at one end and a UHF RFID antenna at the other end. In certain configurations, the first coupling area 310, the second coupling area 312, and/or the third coupling area 314 can be a different size than the overlap area; for example the coupling area can be smaller than the overlap area as illustrated in FIG. 3B.

Figure 3C:
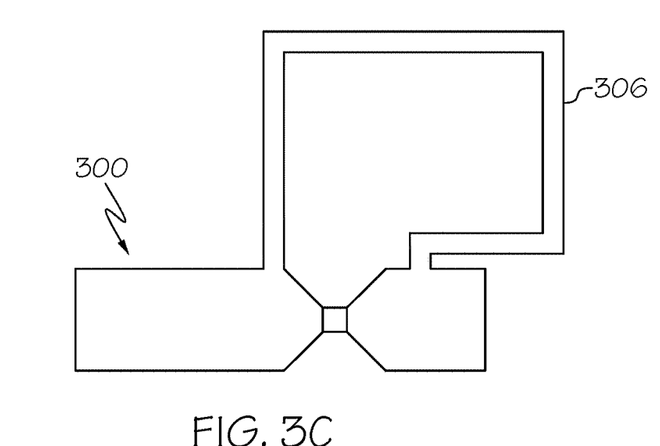
FIG. 3C is a diagram of a UHF tuning loop of the combined EAS and RFID circuit of FIG. 3B according to an embodiment of the disclosure.

Referring now also to FIG. 3C, in certain embodiments, the dual mode strap 300 of FIGS. 3A and 3B can include a UHF tuning loop 306. Because both coil ends of the coil antenna of FIG. 3B are coupled to the large coupling pad 302 (and not the small coupling pad 304), the UHF tuning loop 306 can be positioned as shown in FIG. 3C so as to be offset from the coil antenna to avoid interference. As described above, the UHF tuning loop 306 can include a fuse type structure that causes the UHF tuning loop 306 to open circuit above a threshold AC current, for example when the EAS function of the circuit is de-activated.

Figure 3D:
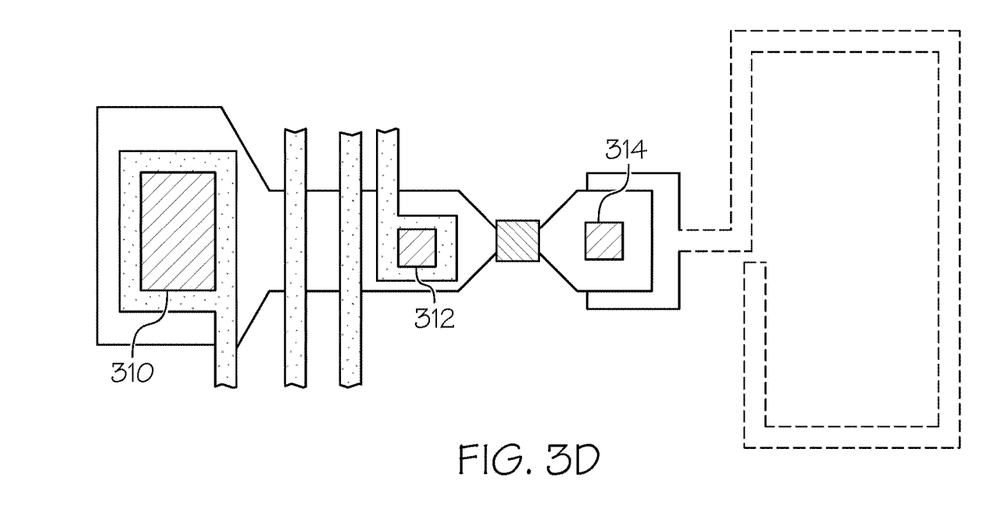
FIG. 3D is a diagram of a third configuration of a combined EAS and RFID circuit according to an embodiment of the disclosure.

Referring now also to FIG. 3(d), in certain embodiments, the first coupling point 310 and second coupling point 312 can be configured to be asymmetric in size so as to concentrate voltage at one of the coupling points (e.g., second coupling point 312, as shown in FIG. 3(d)) for de-activating the circuit by exposing the circuit to a high strength field at the resonant frequency of the circuit.

Figure 4:
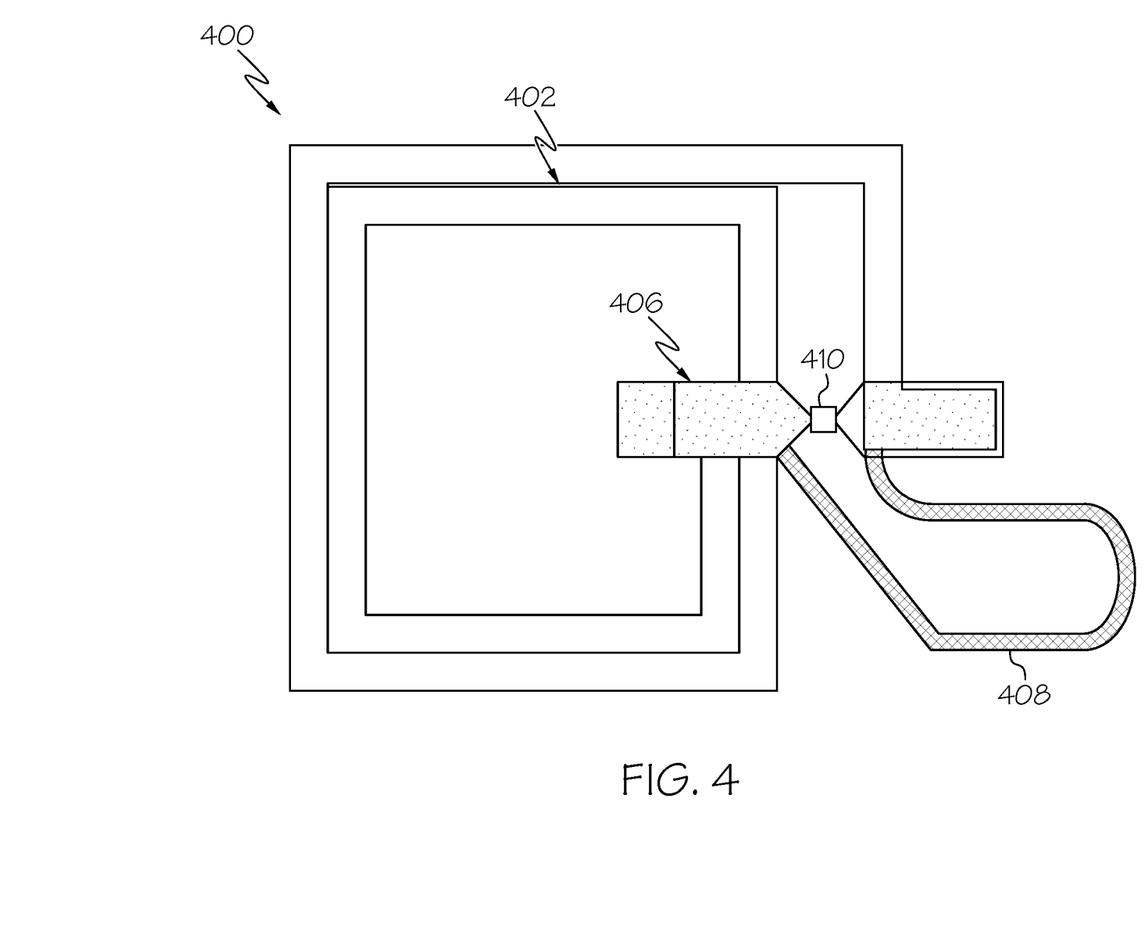
FIG. 4 is a diagram of a fourth configuration of a combined EAS and RFID circuit according to an embodiment of the disclosure.
Figure 4A:
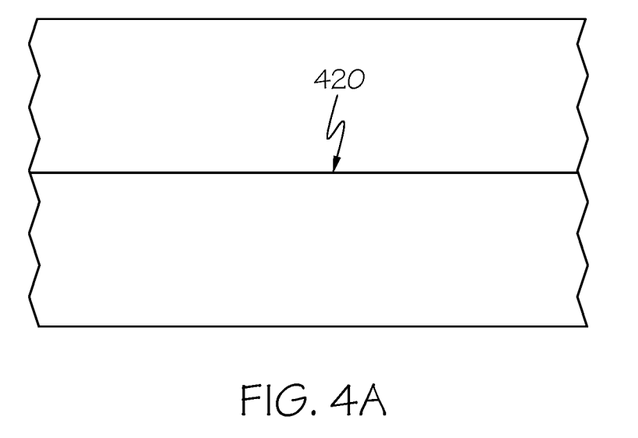
FIG. 4A is a diagram of a first configuration of turns of the coil antenna of the combined EAS and RFID circuit of FIG. 4 according to an embodiment of the disclosure.
Figure 4B:
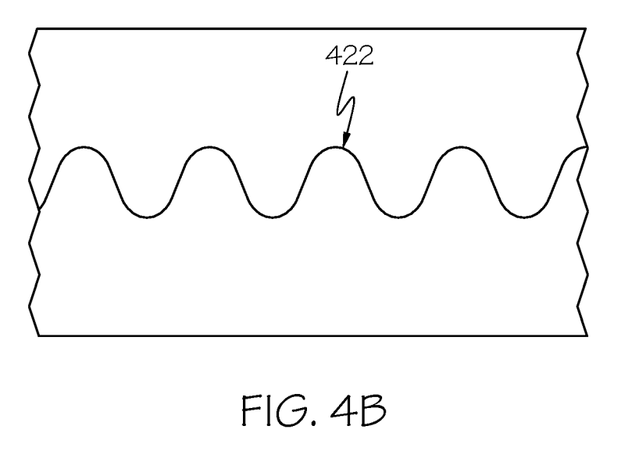
FIG. 4B is a diagram of a second configuration of turns of the coil antenna of the combined EAS and RFID circuit of FIG. 4 according to an embodiment of the disclosure.

Referring now to FIG. 4, a modified coil antenna structure 400 is depicted. The modified coil antenna structure 400 is configured to have a large coil with a narrow gap width 402 between turns. This causes the coil antenna to act a sloop type antenna such that at UHF frequencies, the energy couples across the narrow gap width 402 to form a short at UHF frequencies, but which allows energy at HF frequencies to flow around the coil antenna turns normally. The coil antenna can include a wider gap width 404 for a portion of the coil antenna for UHF frequencies. A strap 406, tuning loop 408, and RFID chip 410 are included as described previously for other embodiments. The coupling between the turns can be enhanced by decreasing the gap width by, for example, laser cutting a narrow gap 420 as illustrated in FIG. 4A, and/or by increasing the relative edge-to-edge area between turns by cutting a curvilinear gap 422 (or cutting any suitable pattern) as illustrated in FIG. 4B.

Figure 5:
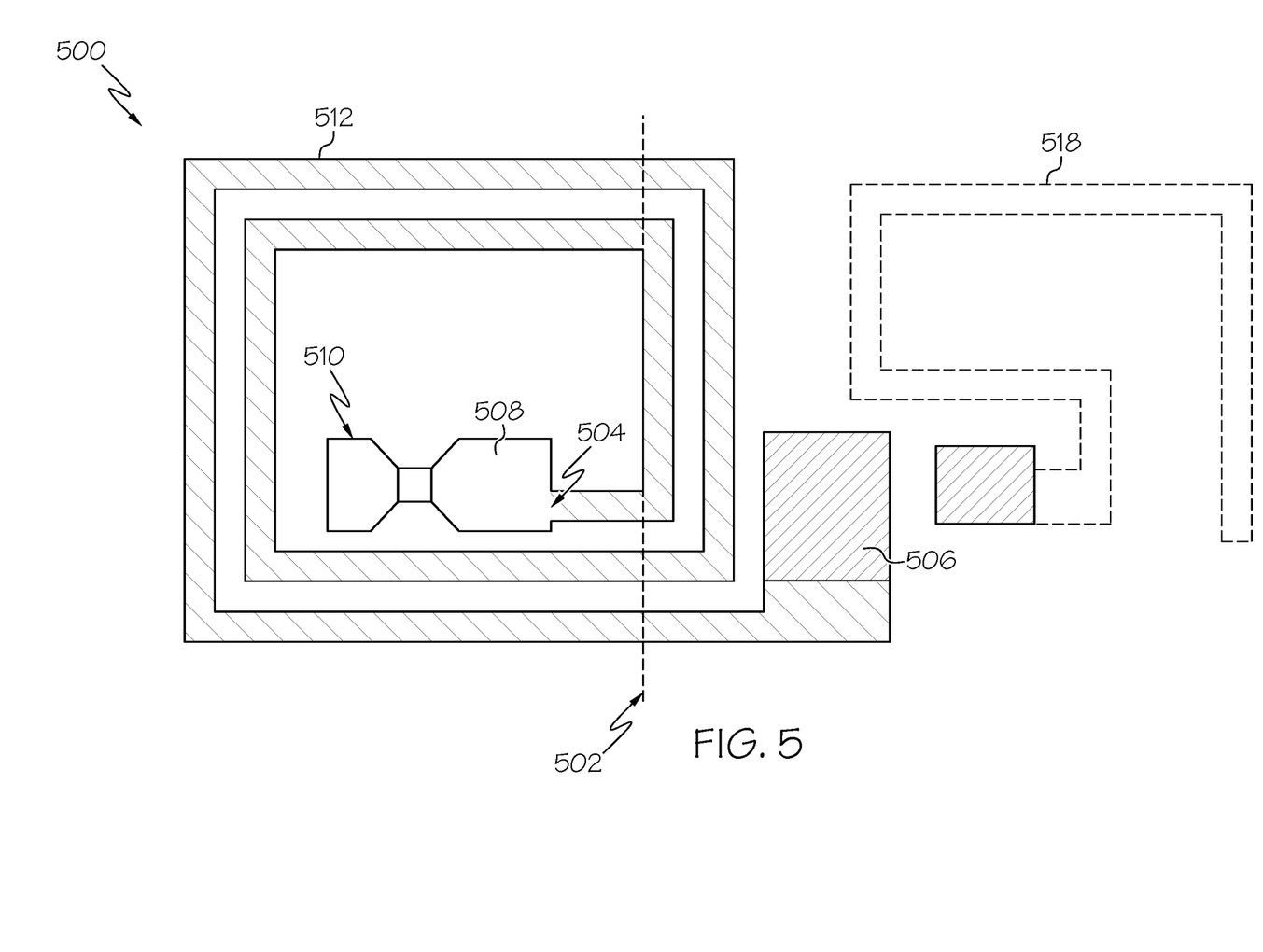
FIG. 5 is a diagram of a first configuration of a folded EAS and RFID circuit according to an embodiment of the disclosure.

Referring to FIG. 5, a first embodiment of a foldover circuit 500 is presented. The foldover circuit 500 can be configured such that when the foldover circuit 500 is folded at a fold line 502, coupling pad 508 of the strap 510 functions as a bridge for coil antenna 512. Coupling pad 508 can be conductively coupled to a first coil end 504 of coil antenna 512. When foldover circuit 500 is folded, coupling pad 508 can be capacitively coupled to second coil end 506 of coil antenna 512, for example using a dielectric adhesive as described above. Similarly, an additional UHF antenna element 518 can be capacitively coupled to the strap 510 when the foldover circuit 500 is folded.

Figure 6:
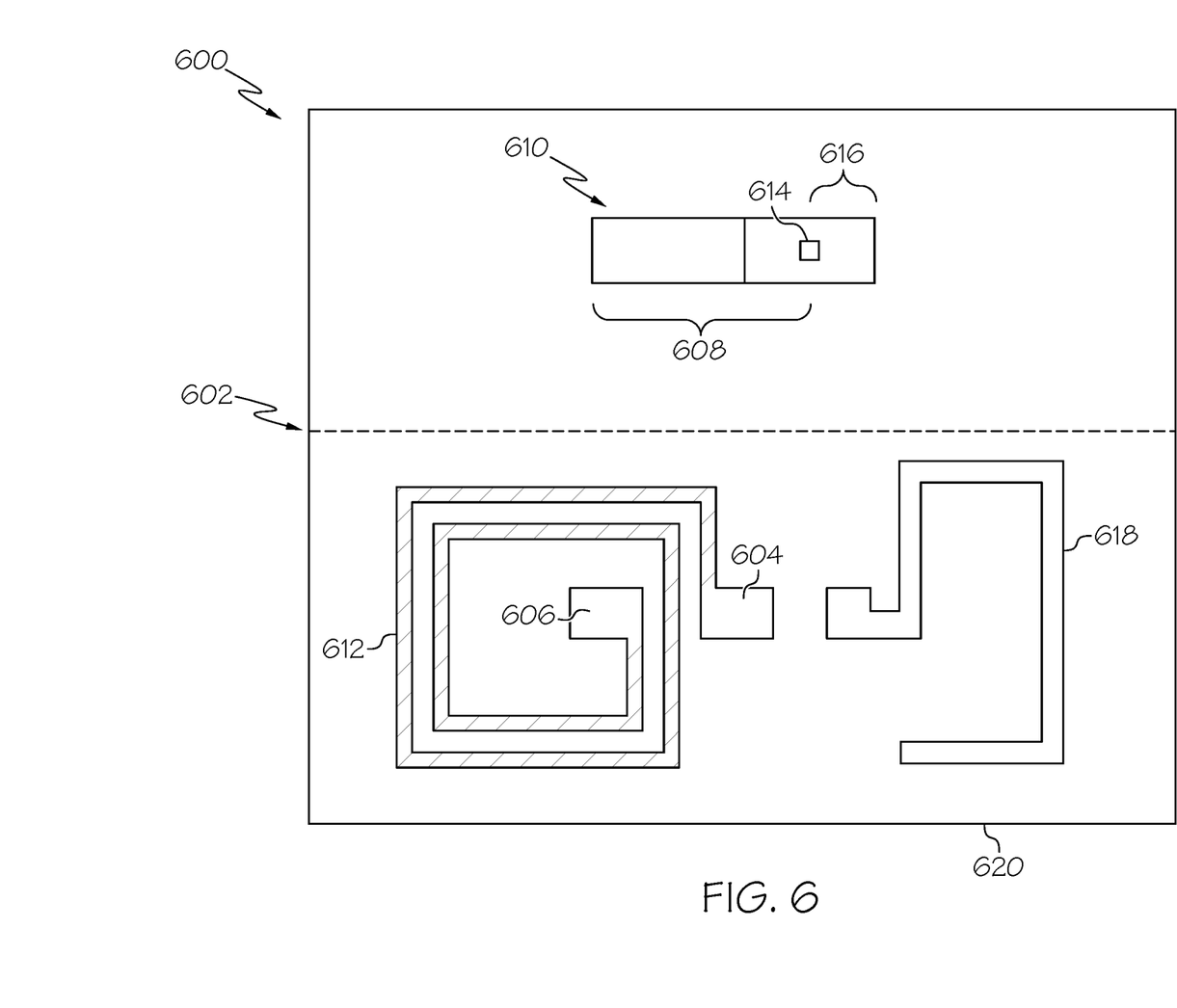
FIG. 6 is a diagram of a second configuration of a folded EAS and RFID circuit according to an embodiment of the disclosure.

Referring to FIG. 6, a second embodiment of a foldover circuit 600 is presented. Foldover circuit 600 can be configured such that when the foldover circuit 600 is folded at fold line 602, a bridge portion 608 (first coupling pad) of the strap 610 contacts a first coil end 604 and a second coil end 606 of coil antenna 612. The bridge portion 608 and coil ends 604, 606 are capacitively coupled using a dielectric adhesive as described above. Similarly, an additional UHF antenna element 618 can be capacitively coupled to a UHF portion 616 (second coupling pad) of the strap 610 when the foldover circuit 600 is folded. The strap 610 and RFID chip 614 can be configured on one side of a substrate 620, while the coil antenna 612 and UHF antenna element 618 can be configured on a second side of the substrate 620. The substrate 620 can comprise any suitable material including, but not limited to, a paper, a card, a plastic such as PET, or a fabric such as nylon or polypropylene. The substrate 620 can be folded at fold line 602 and the two sides laminated together.

Figure 7:
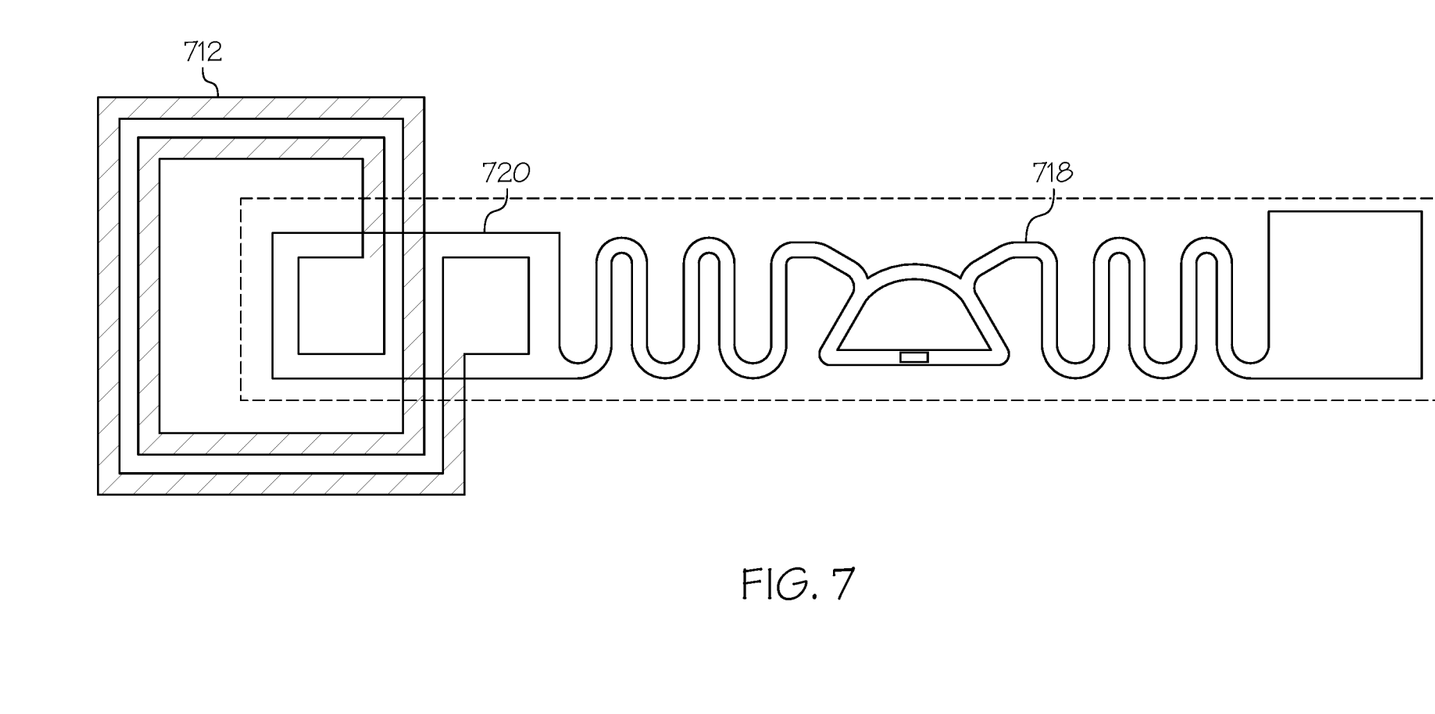
FIG. 7 is a diagram of a fifth configuration of a combined EAS and RFID circuit according to an embodiment of the disclosure.

Referring now to FIG. 7, in an embodiment a portion of a UHF antenna 718 functions as a bridge. In such embodiments, a structure at the end of a UHF antenna 718 commonly described as a top load 720, and comprising a relatively large area of conductor, functions as the resonating capacitor in the circuit with the coil antenna 712. To manufacture, the UHF antenna 718 can be applied to the coil antenna 712 or the coil antenna 712 can be applied to the top load 720 portion of the UHF antenna 718. The RFID chip can be directly attached, commonly described as a flip chip, or can be built with a strap as described above, and can be attached before or after the coil antenna 712. Additional details about the manufacture and use of RFID straps are described in U.S. Pat. Nos. 7,158,037 and 7,292,148, each incorporated herein by reference in their respective entireties.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A device, comprising:
   a Radio Frequency Identification (RFID) chip;
   an ultra high frequency (UHF) tuning loop conductively coupled to the RFID chip;
   a first coupling pad conductively coupled to the RFID chip and the UHF tuning loop;
   a second coupling pad conductively coupled to the RFID chip and the UHF tuning loop; and
   a high frequency (HF) coil antenna including a first coil end configured to couple with the first coupling pad and a second coil end configured to couple with the second coupling pad and the HF coil antenna includes a plurality of turns and wherein the HF coil antenna includes a gap between a first turn and a second turn for placement of the UHF tuning loop between the first turn and the second turn.

2. The device of claim 1, further comprising:
a UHF antenna coupled to exactly one of the first coupling pad or the second coupling pad.

3. The device of claim 1, wherein placement of the UHF tuning loop in the gap is configured to reduce electromagnetic interference between the HF coil antenna and the UHF tuning loop.

4. The device of claim 1, wherein the first coil end is conductively coupled to the first coupling pad, and wherein the second coil end is conductively coupled to the second coupling pad.

5. The device of claim 1, wherein the first coil end is capacitively coupled to the first coupling pad, and wherein the second coil end is capacitively coupled to the second coupling pad.

6. The device of claim 5, wherein at least one of the capacitively coupled coil end and the associated coupling pad are configured to open circuit upon application of a field, at a resonant frequency, with intensity sufficient to exceed a threshold capacitive breakdown voltage of the at least one of the capacitively coupled coil end and the associated coupling pad.

7. The device of claim 5, wherein one or more of the capacitively coupled coil end or the associated coupling pad includes a conductive surface treated by laser ablation.

8. The device of claim 7, wherein the conductive surface treated by laser ablation is configured to reduce a threshold capacitive breakdown voltage between the one or more of the capacitively coupled coil end and the associated coupling pad.

9. The device of claim 5, further comprising:
a dielectric adhesive configured to join at least one of the capacitively coupled coil end and the associated coupling pad.

10. The device of claim 5, further comprising:
a substrate configured to fold along a fold line, and join at least one coil end and one associated coupling pad when folded, and
wherein the RFID chip and the associated coupling pad are displaced only on one side of the fold line of the substrate, and
wherein at least a portion of the HF coil antenna is on the other side of the fold line.

11. The device of claim 1, wherein the first coil end is capacitively coupled to the first coupling pad with a first capacitance $C_1$, wherein the second coil end is capacitively coupled to the second coupling pad with a second capacitance $C_2$, and wherein $C_1$ and $C_2$ are not equal.

12. The device of claim 11, wherein $C_1$ and $C_2$ are different due, at least in part, to differences in geometries of the first coil end and the second coil end.

13. The device of claim 11, wherein $C_1$ and $C_2$ are different due, at least in part, to differences in an overlapping area of the first coil end and the first coupling pad compared to an overlapping area of the second coil end and the second coupling pad.

14. The device of claim 11, wherein the dielectric adhesive used to couple the coil end to the coupling pads is formulated to undergo a dielectric breakdown at a threshold breakdown voltage that is lower than a voltage presented at $C_1$ but higher than a voltage presented at $C_2$.

* * * * *